(12) United States Patent
Guenther

(10) Patent No.: US 6,975,982 B1
(45) Date of Patent: Dec. 13, 2005

(54) SOFTWARE EDITOR CAPABLE OF AUTOMATICALLY EDITING SOFTWARE FOR MULTIPLE LANGUAGES

(75) Inventor: Erich Guenther, Herzogenaurach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/464,403

(22) Filed: Dec. 16, 1999

(51) Int. Cl.[7] .......................... G06F 17/24; G06F 17/28
(52) U.S. Cl. ............................................. 704/1; 704/2
(58) Field of Search .................................. 704/1, 2, 8, 9

(56) References Cited

U.S. PATENT DOCUMENTS

| | | | | |
|---|---|---|---|---|
| 5,579,223 A | * | 11/1996 | Raman ........................... | 704/1 |
| 5,583,761 A | * | 12/1996 | Chou ............................. | 704/2 |
| 5,664,206 A | * | 9/1997 | Murow et al. ................. | 704/8 |
| 5,819,303 A | * | 10/1998 | Calhoun ........................ | 704/8 |
| 6,092,036 A | * | 7/2000 | Hamann ........................ | 704/8 |
| 6,139,201 A | * | 10/2000 | Carbonell et al. ............. | 704/8 |
| 6,522,999 B2 | * | 2/2003 | Fuji ............................. | 704/2 |

* cited by examiner

Primary Examiner—David D. Knepper
(74) Attorney, Agent, or Firm—Sughrue Mion, PLLC

(57) ABSTRACT

A software editor that automatically edits multiple language versions of textual information is provided. The software editor is contained on a computer-readable medium and includes software instructions. The software instructions instruct a computer to edit a first language version of the textual information in accordance with a first modification. If the first language version is edited in accordance with the first modification, the software instructions instruct the computer to automatically edit a second language version of the textual information in accordance with a second modification. Also, the second modification of the second language version is identical to the first modification of the first language version if the first modification is compatible with the second language version. On the other hand, the second modification of the second language version is different but substantially equivalent to the first modification of the first language version if the first modification is not compatible with the second language version. In addition, an editing device that executes the software instructions of the software editor and a method performed by the software instructions are also provided.

46 Claims, 16 Drawing Sheets

SOFTWARE EDITOR CAPABLE OF AUTOMATICALLY EDITING SOFTWARE FOR MULTIPLE LANGUAGES

BACKGROUND OF THE INVENTION

1. Field of the Invention

The present invention relates to a software editor that edits operating instructions, tutorials, and/or display screens for various devices, such as control, manufacturing, and monitoring devices used in factories. More particularly, the present invention relates to a software editor that is capable of automatically editing different language versions of operating instructions, tutorials, and/or display screens. In addition, the present invention relates to a method performed by the software editor.

2. Description of the Related Art

Many companies manufacture and sell technologically complex devices that are used in factories to monitor and control various operations. Due to the complex nature of the devices, lengthy and detailed operating instructions (e.g. operating manuals or tutorials) must be provided with the devices to enable end users to properly operate them. In addition, many of the devices display information on a display screen to provide the users with feedback relating to the operation of the devices and/or relating to information being monitored by the devices.

In today's international marketplace, monitoring and control devices are often sold to companies located in different countries. Thus, the same operating instructions and information displayed by the devices must be written in different languages so that the end users in different countries can understand them. For example, if a particular device is sold to customers in Germany, the United States, and Thailand, at least the following three different versions of the operating instructions or display information must be created: a German language version, an English language version, and a Thai language version.

The information displayed on the display screen of the monitoring and control devices is generated via software. Also, the instruction manuals and tutorials are typically created via a word processing application program and stored as software. During the development of the operating instructions and display information, the words and phrases used in the instructions and information are revised and edited via a software editor. In addition, not only is the substantive content of the instructions and information revised, but the font, size, and other attributes of the text are often changed. For example, to further emphasize a particular word in the operating instructions or display information, its size may be increased and it may be bolded. Also, in order to change the aesthetic appearance of a particular word or phrase, the font type of the word or phrase may be changed.

Naturally, when one version (e.g. the German language version) of the operating instructions or display information is revised, the other versions (e.g. the English and Thai language versions) of the operating instructions or display information should be similarly changed so that all versions are consistent with each other. Thus, during the editing process, the user must separately and manually edit the German, English, and Thai language versions of the operating instructions or display information. However, separately editing multiple versions of the same operating instructions or display information is time-consuming and prone to human error.

SUMMARY OF THE INVENTION

An objective of the present invention is to provide a method that automatically edits different language versions of textual information.

Another objective of the present invention is to provide a software editor that automatically edits different language versions of textual information.

Still another objective of the present invention is to provide an editing device that automatically edits different language versions of textual information.

In order to achieve the above and other objectives, a method of editing multiple language versions of textual information is provided. The method comprises: (a) editing a first language version of said textual information in accordance with a first modification; and (b) automatically editing a second language version of said textual information in accordance with a second modification if said first language version is edited in accordance with said first modification, wherein said second modification of said second language version is identical to said first modification of said first language version if said first modification is compatible with said second language version, and wherein said second modification of said second language version is different but substantially equivalent to said first modification of said first language version if said first modification is not compatible with said second language version.

In order to further achieve the above and other objectives, a software editor is provided. The software editor is contained on a computer-readable medium, is adapted to edit multiple language versions of textual information, and comprises software instructions for: (a) editing a first language version of said textual information in accordance with a first modification; and (b) automatically editing a second language version of said textual information in accordance with a second modification if said first language version is edited in accordance with said first modification, wherein said second modification of said second language version is identical to said first modification of said first language version if said first modification is compatible with said second language version, and wherein said second modification of said second language version is different but substantially equivalent to said first modification of said first language version if said first modification is not compatible with said second language version.

In order to even further achieve the above and other objectives, an editing device for editing multiple language versions of textual information is provided. The editing device comprises: an input unit for inputting commands from a user; a storage device for storing said textual information; and a controller coupled to said storage device and said input unit, wherein said controller edits a first language version of said textual information in accordance with a first modification input from said user via said input unit and automatically edits a second language version of said textual information in accordance with a second modification if said first language version is edited in accordance with said first modification, wherein said second modification of said second language version is identical to said first modification of said first language version if said first modification is compatible with said second language version, and wherein said second modification of said second language version is different but substantially equivalent to said first modification of said first language version if said first modification is not compatible with said second language version.

BRIEF DESCRIPTION OF THE DRAWINGS

The above and other objectives and advantages of the present invention will become more apparent by describing in detail preferred embodiments thereof with reference to the attached drawings in which.

DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

The present invention relates to a software editor for editing textual information. In a preferred embodiment, the textual information constitutes an operating manual, tutorial, and/or display screen information for a device (e.g. a monitoring or control apparatus used in a factory).

With respect to the operating manual or tutorial, the textual information may be printed on pages of paper, and the pages may be compiled to create a hardcopy of the operating manual or tutorial. Additionally or alternatively, software versions of the operating manual or tutorial may be created from the textual information and may be provided to an end user via an optical disk, floppy disk, hard disk, carrier waves (e.g. the internet), memory chip, etc. On the other hand, the display screen information contains textual information that is displayed on a display screen during the operation of the apparatus. For example, if the apparatus is a device that monitors the pressure at a particular valve in a factory, the apparatus may contain a screen that graphically and textually displays the pressure at the valve. Other types of display screen information may include information that indicates whether or not the device is operating properly, needs servicing, etc. Clearly, the above examples of the textual information are merely illustrative, and the textual information can be virtually any type of textual information.

Figure 1:
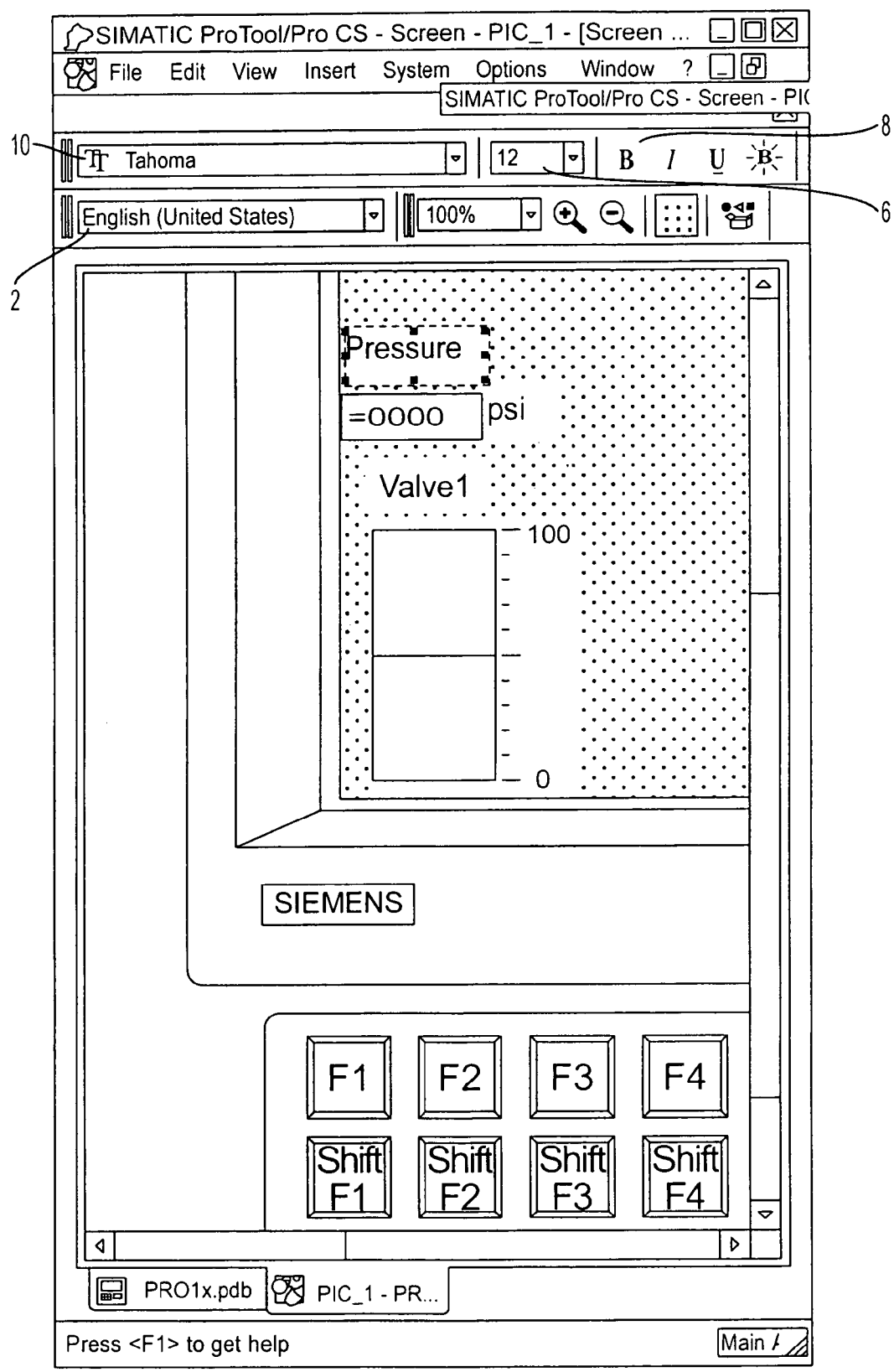
FIG. 1 is an illustrative example of a screen display of a software editor displaying an English version of technical information according to an embodiment of the present invention.
Figure 2:
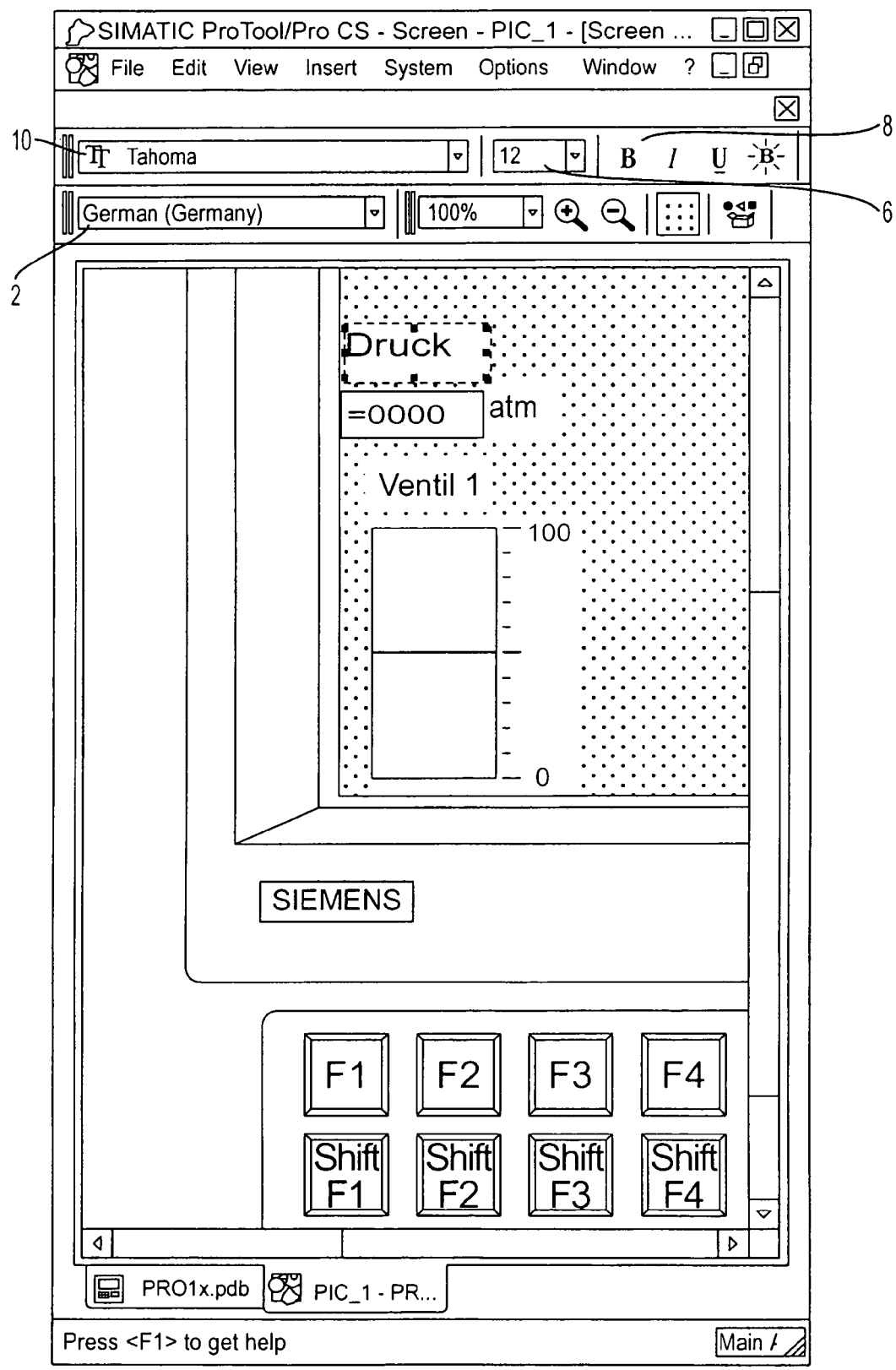
FIG. 2 is an illustrative example of the screen display of the software editor displaying a German version of the technical information according to the embodiment of the present invention.
Figure 3:
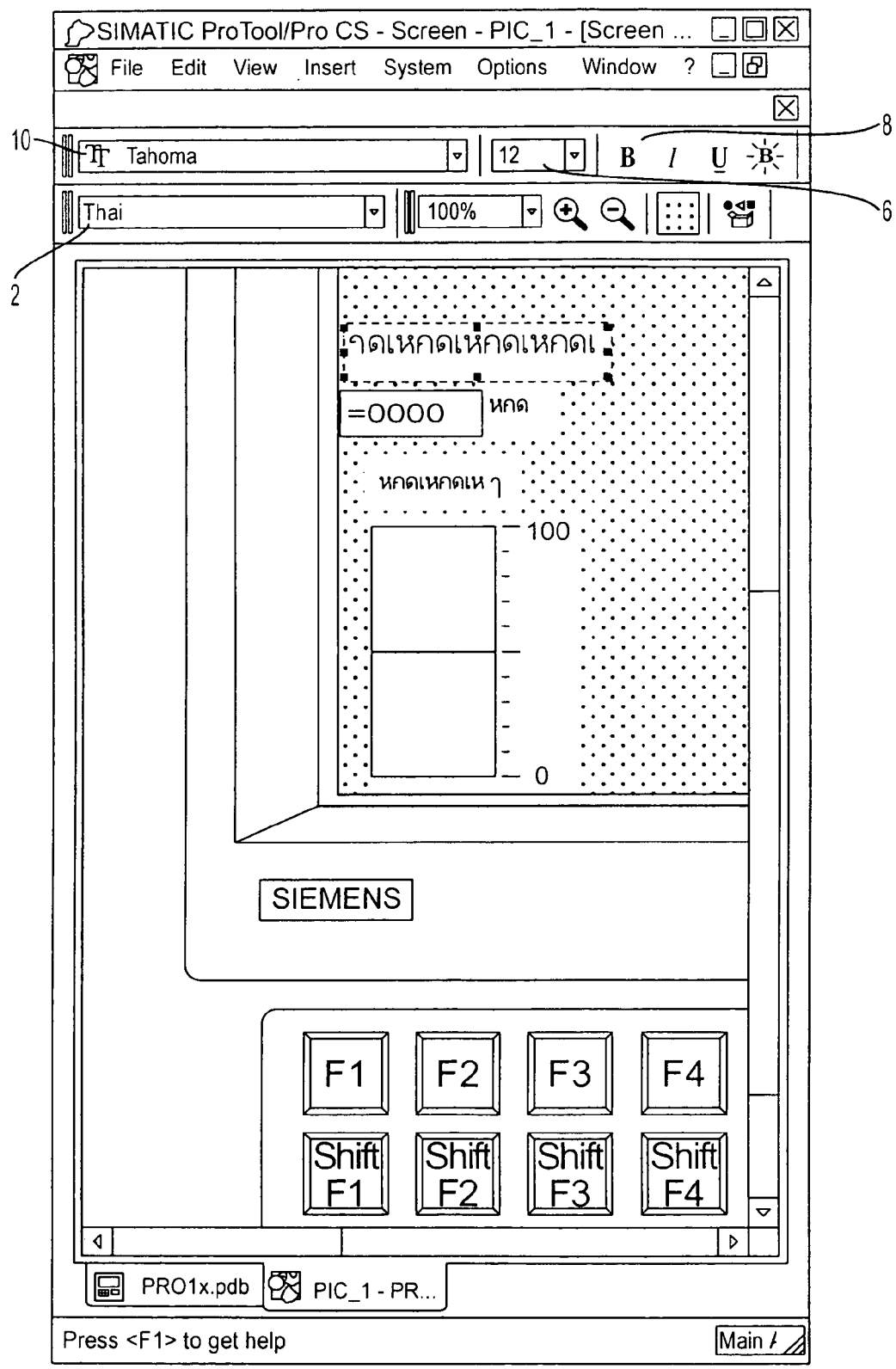
FIG. 3 is an illustrative example of the screen display of the software editor displaying a Thai version of the technical information according to the embodiment of the present invention.
Figure 4:
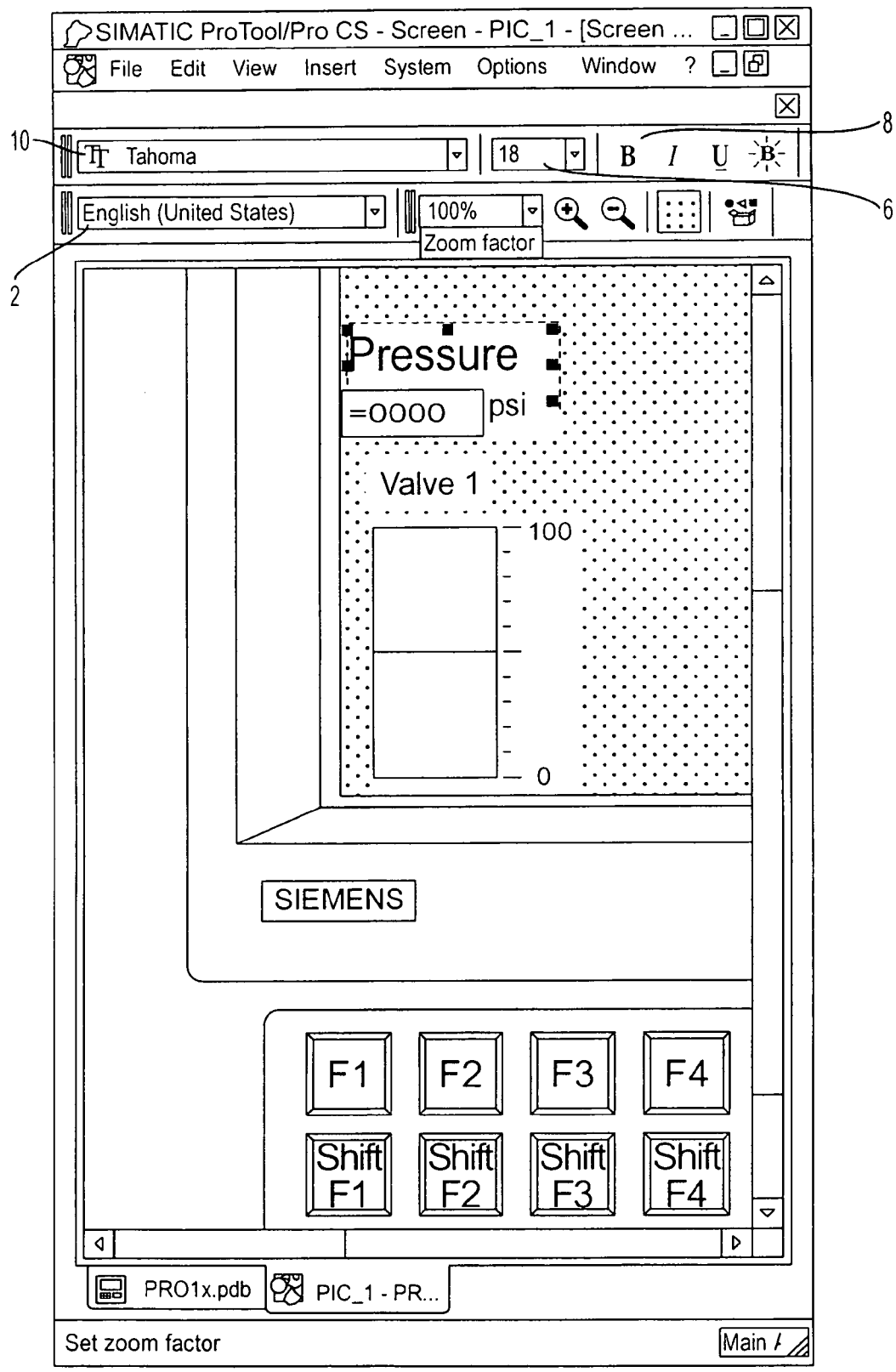
FIG. 4 is an illustrative example of the screen display of the software editor displaying the English version of the technical information in which the font size of a particular word of the technical information has been changed.

Also, operator manuals, tutorials, and display screen information are typically used in conjunction with devices that are sold to different countries. Therefore, different language versions of the textual information are typically created. For example, FIGS. 1–3 illustrate screen displays of a software editor that edits textual information contained in an operator manual, tutorial, or display screen of an apparatus that monitors or controls pressure at a valve in a factory. Specifically, FIG. 1 shows the editor displaying an English version of the textual information, FIG. 2 shows the editor displaying a German version of the information, and FIG. 3 shows the editor displaying a Thai version of the information.

In the preferred embodiment shown in FIGS. 1–3, the software editor is implemented as a Windows™-based application program to improve its "user-friendliness". The application program uses an interface that is very similar to the well known interface used in Microsoft Word™ for Windows™, and thus, a detailed description of many of the commands and inputs for the application program is omitted for the sake of brevity.

When textual information corresponding to a particular operator manual, tutorial, or display screen is loaded into the editor, a user can display the English version of the information as follows. First, the user selects the language drop down box 2 to display a list of language options and then selects the "English (United States)" option. Similarly, the user can display the German and Thai versions of the information by selecting the "German (Germany)" and "Thai" options, respectively, from the drop down box 2. (FIGS. 2 and 3).

In many instances, when one language version (e.g. the German version) of the textual information is revised in a certain way, the software editor analyzes the remaining versions (e.g. the English and Thai versions) of the information and locates the portions in the English and Thai versions that correspond to the revised portion in the German version. Then, the software editor automatically revises the English and Thai versions in the same way that the user manually edited the German version. In other words, the editing of the German version causes the software editor to automatically edit the English and Thai versions.

Figure 5:
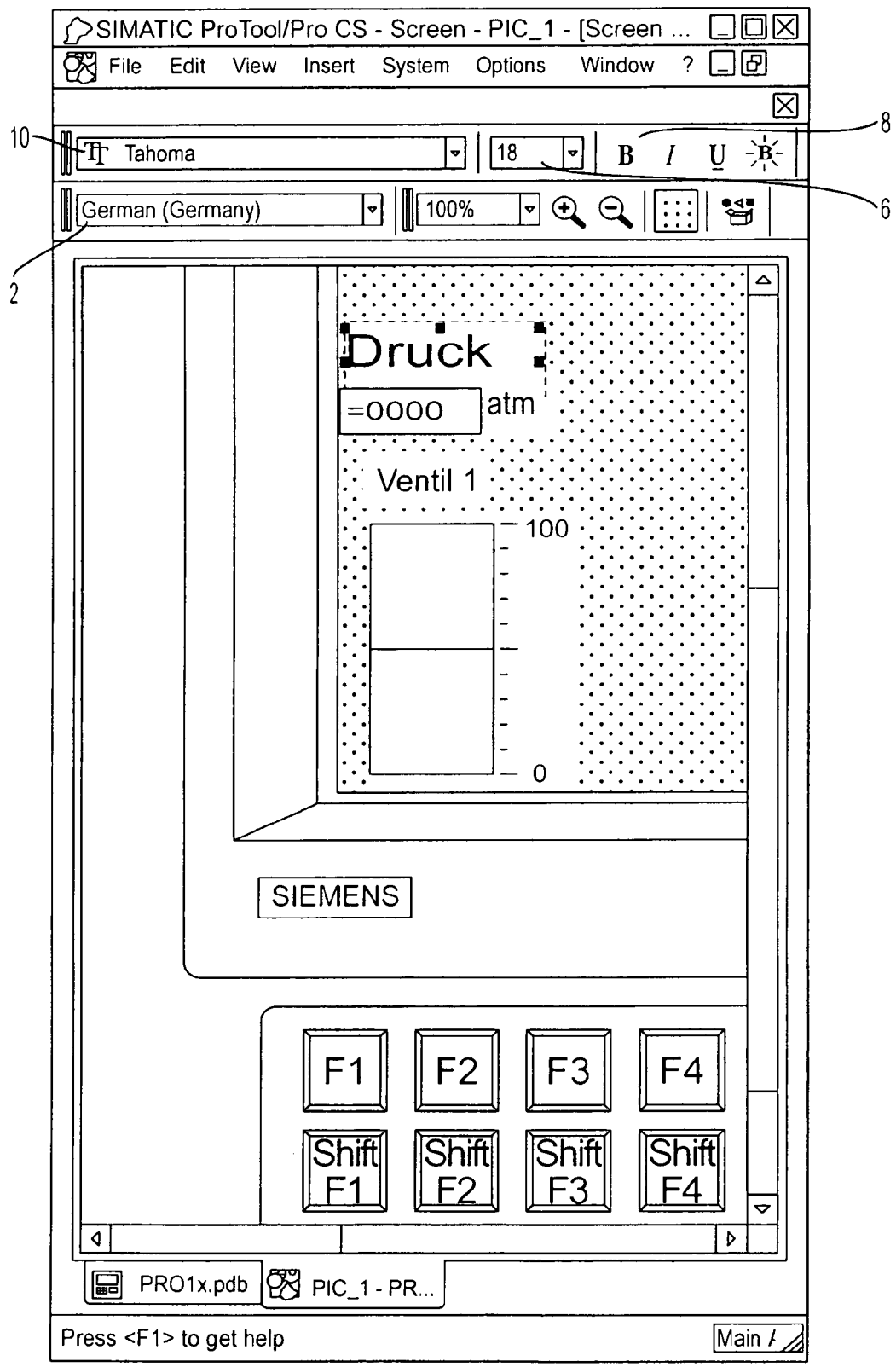
FIG. 5 is an illustrative example of the screen display of the software editor displaying the German version of the technical information in which the font size of a particular word of the technical information has been changed.
Figure 6:
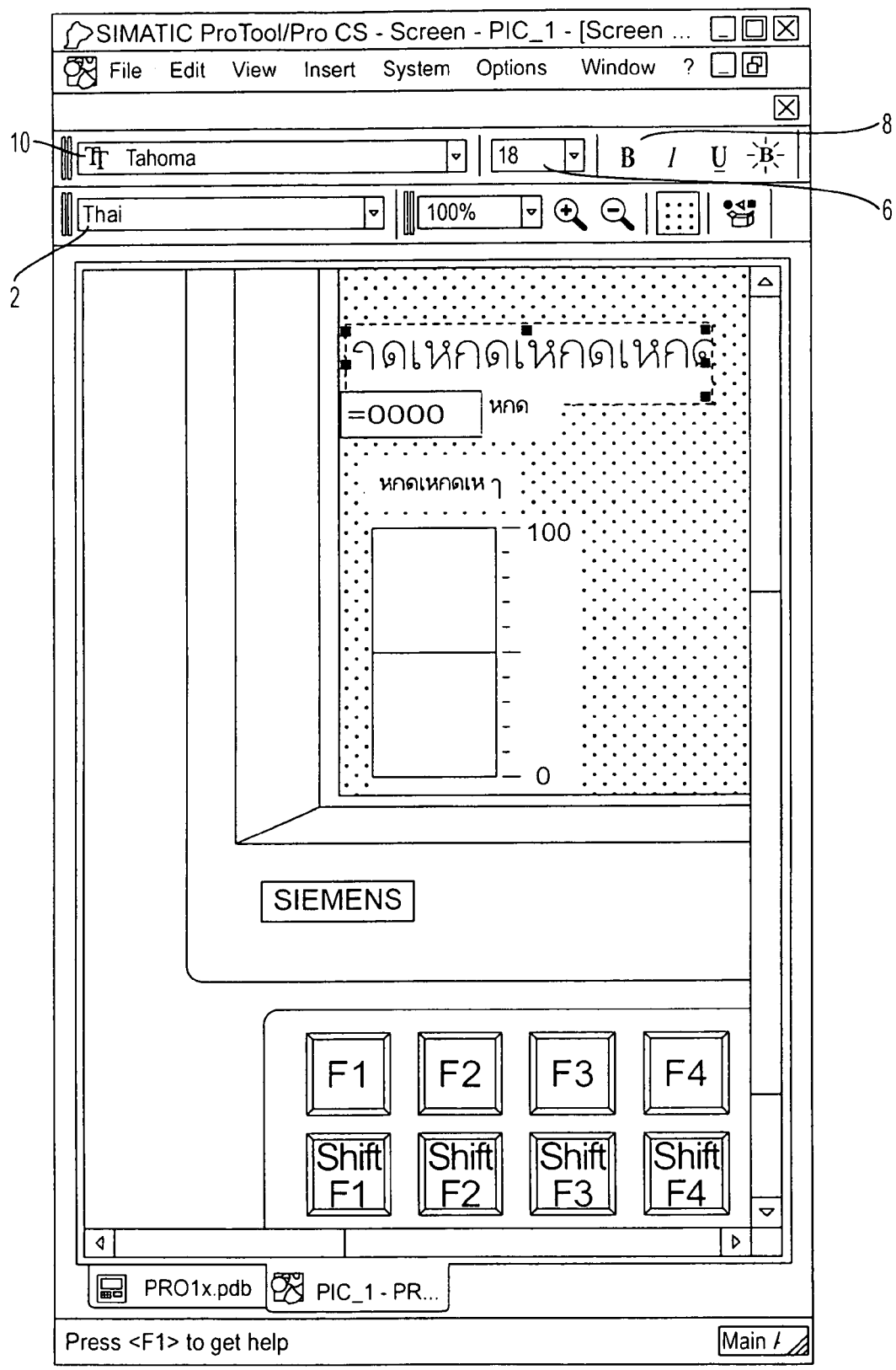
FIG. 6 is an illustrative example of the screen display of the software editor displaying the Thai version of the technical information in which the font size of a particular word of the technical information has been changed.
Figure 7:
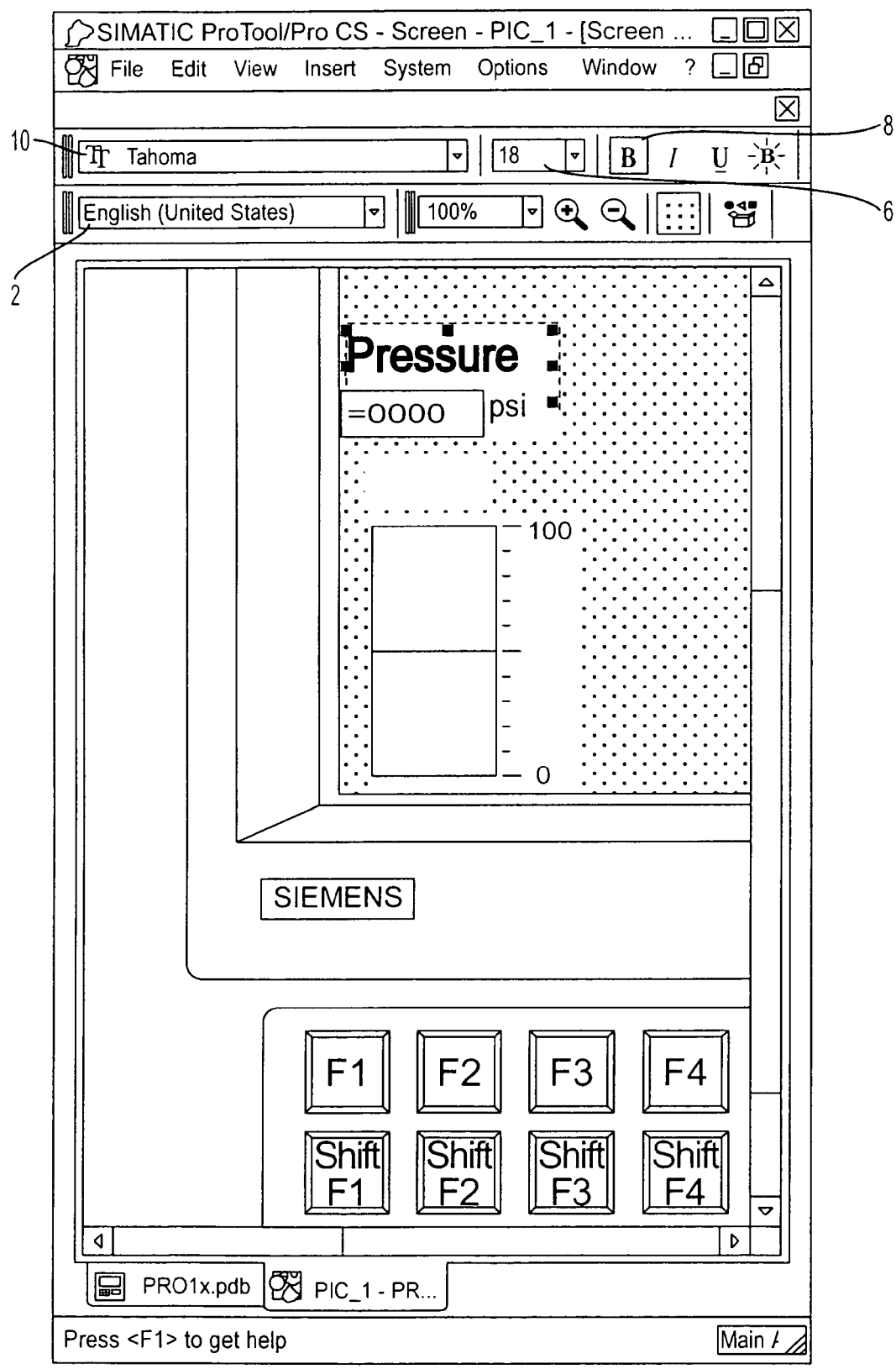
FIG. 7 is an illustrative example of the screen display of the software editor displaying the English version of the technical information in which the font size and font style of a particular word of the technical information have been changed.

For example, as shown in FIGS. 2 and 5, the user can display the German version of the textual information and can select a particular German word (e.g. "Druck"). Then, the user can select the font size drop down box 6 and can select the "18" option from the box 6 to change the font size of the German word "Druck" from a 12 point font size to an 18 point font size to emphasize the word "Druck". When the font size of the German word is changed in the German version, the software editor analyzes the English and Thai versions and locates the portions in the English and Thai versions that correspond to the revised portion of the German version. Then, as shown in FIGS. 1, 3, 4, and 6, the font size of the corresponding English word (i.e. "Pressure") and Thai word in the English and Thai versions of the textual information are automatically changed from a 12 point font size to an 18 point font size. In other words, the font size of the English and Thai words are automatically changed in the same manner as the font size of the German word was changed.

Figure 8:
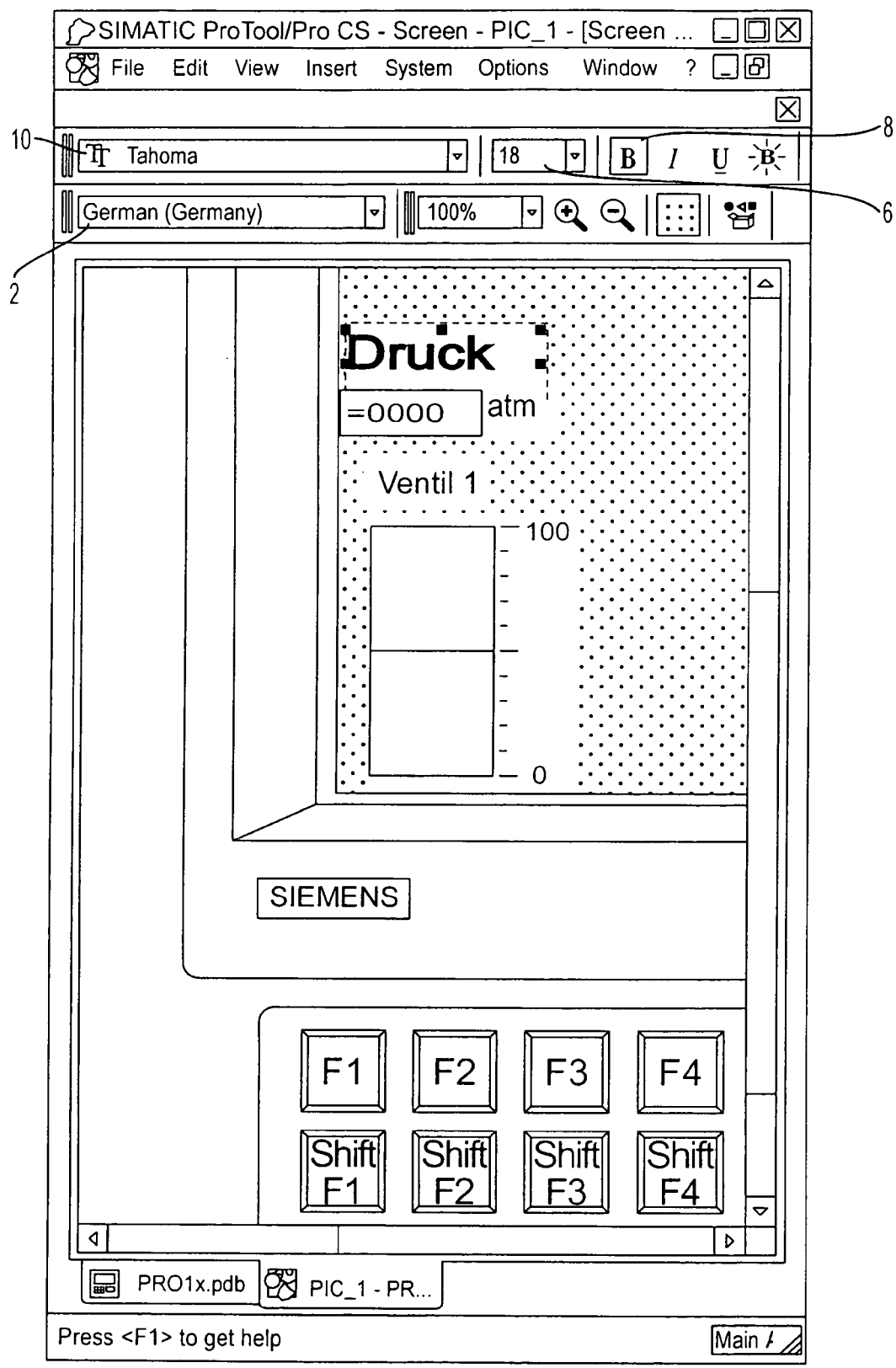
FIG. 8 is an illustrative example of the screen display of the software editor displaying the German version of the technical information in which the font size and font style of a particular word of the technical information have been changed.
Figure 9:
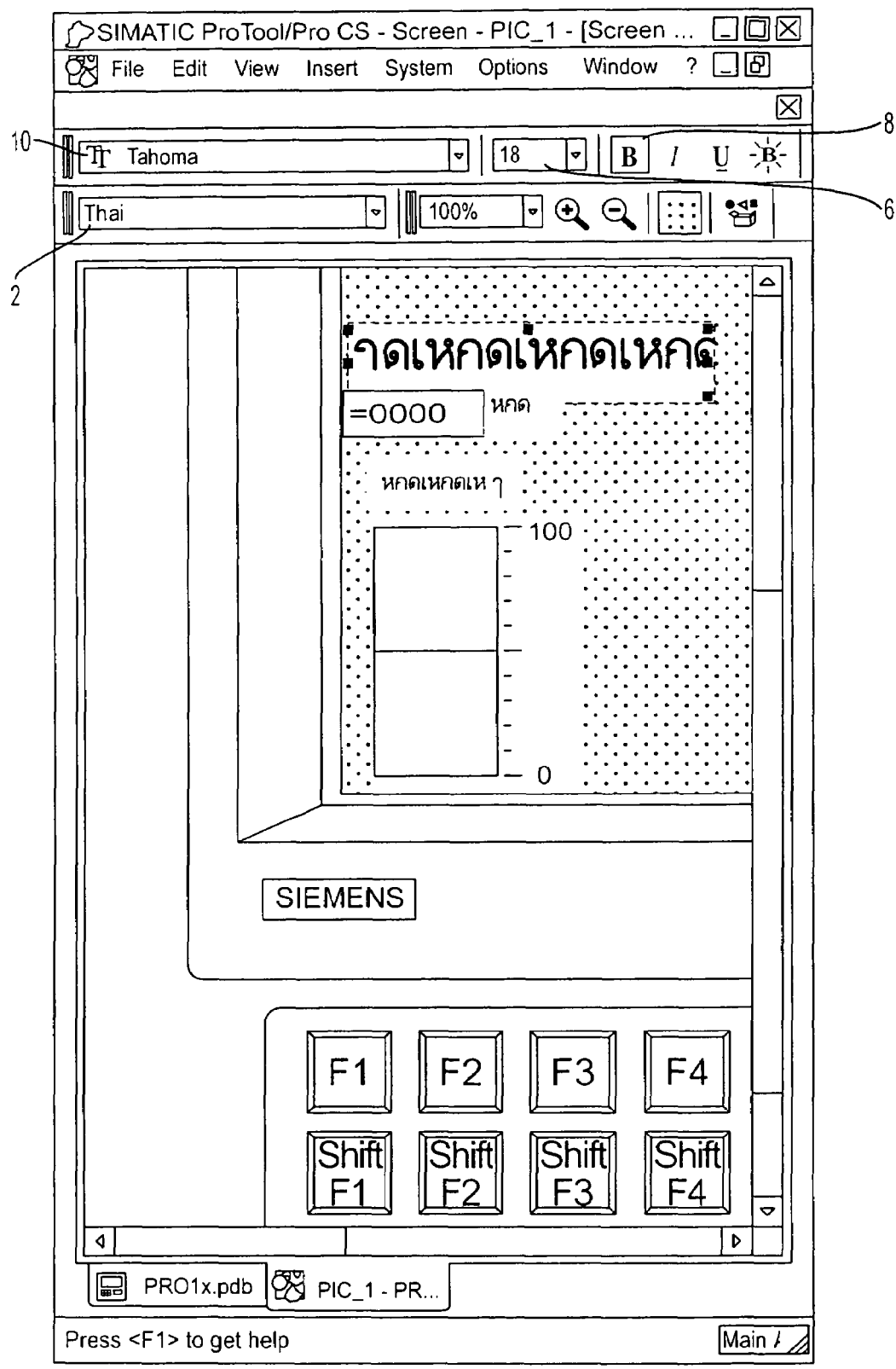
FIG. 9 is an illustrative example of the screen display of the software editor displaying the Thai version of the technical information in which the font size and font style of a particular word of the technical information have been changed.

Besides changing the size of the German word "Druck", the user can further emphasize the word by displaying it in a boldface font style as shown in FIGS. 5 and 8. Specifically, the user can select the word "Druck" and can press the bold button (i.e. the B button) 8. Again, when the German word is changed from normal type to boldface type, the software editor analyzes the English and Thai versions of the information and automatically bolds the corresponding English word "Pressure" and Thai word. (FIGS. 4, 6, 7, and 9).

As described above, when the user revises one version of the textual information, the software editor automatically revises the remaining versions of the information. Therefore, the user does not have to repeatedly make the same changes to each version of the information, and thus, the probability that the user will forget to edit one of the versions or will incorrectly edit one of the versions is significantly reduced. Also, by not having to repeatedly revise each version separately, the editing process is simplified and is much less time-consuming.

Also, due to the different ways in which different languages represent words or phrases, a particular revision to a word or phrase in one language may not be applicable to the same or similar word or phrase in another language. For example, English words are represented by Roman alphabetic characters, and thus, such words can be emphasized by italicizing them. On the other hand, many Japanese and Chinese words are represented by kanji characters in which the slope and relative orientation of the lines within the characters are essential to understanding the characters. Therefore, if a word represented by kanji characters is italicized, the slope and orientation of the lines change, and the meaning of the word may become unintelligible. As a result, if a word in an English version of the textual information is italicized and the software editor automatically italicizes the corresponding word in a Japanese or Chinese version, the Japanese or Chinese word may become unrecognizable.

Similarly, if a Japanese or Chinese word is bolded, the lines of the kanji characters become thicker. As a result, the spaces between the lines of the characters may become extremely small, and adjacent lines within the characters may actually overlap and render the characters unreadable. Therefore, if an English word in an English version of the textual information is bolded and the software editor automatically bolds the corresponding word in a Japanese or Chinese version, the Japanese or Chinese word may become unreadable.

In order to overcome the above problem, the software editor may be designed to determine if a particular modification in one language version (e.g. an English version) is applicable to the remaining language versions of the textual information. If the change is not applicable to one of the remaining language versions (e.g. a Japanese version), the editor may automatically modify the Japanese version with a compatible modification that is different but substantially equivalent to the modification of the English language version. In the example above, if an English word is italicized or bolded in the English version of the textual information, the software editor may determine that such a modification is not compatible in the Japanese version. Therefore, instead of italicizing or bolding the corresponding Japanese word, the software editor may underline it.

To perform the above operation, an illustrative, hypothetical embodiment of the software editor stores a predetermined look up table shown below. The look up table indicates how the font styles of the various language versions of the textual information are to be automatically changed when the user changes the font style of a selected language version.

TABLE 1

| LANGUAGE VERSION | FONT STYLE CHANGE FOR THE SELECTED LANGUAGE VERSION | FONT STYLE CHANGE FOR THE AUTOMATICALLY EDITED LANGUAGE VERSION |
|---|---|---|
| Chinese | Bold | Underline |
|  | Italics | Underline |
|  | Underline | Underline |
| English | Bold | Bold |
|  | Italics | Italics |
|  | Underline | Underline |
| French | Bold | Bold |
|  | Italics | Italics |
|  | Underline | Underline |
| German | Bold | Bold |
|  | Italics | Italics |
|  | Underline | Underline |
| Japanese | Bold | Underline |
|  | Italics | Underline |
|  | Underline | Underline |

TABLE 1-continued

| LANGUAGE VERSION | FONT STYLE CHANGE FOR THE SELECTED LANGUAGE VERSION | FONT STYLE CHANGE FOR THE AUTOMATICALLY EDITED LANGUAGE VERSION |
|---|---|---|
| Thai | Bold | Bold |
|  | Italics | Bold |
|  | Underline | Underline |

In the example described above, the user manually edits an English word in the English version (i.e. the selected language version) by italicizing (or bolding) it. Then, when the software editor is automatically editing the Japanese version (i.e. the automatically edited language version), it determines that the English version was edited by italicizing (or bolding) the English word. As shown in the look up table, when the English word is italicized (or bolded), the corresponding word in the Japanese language version should be underlined. Thus, the software editor changes the corresponding Japanese word in the Japanese version to an underlined font style instead of an italics (or bold) font style.

Clearly, the specific data stored in the look up table in Table 1 merely corresponds to the hypothetical embodiment, and the specific data obviously can be changed in many different ways. For example, if Chinese and Japanese words can be italicized without rendering them unrecognizable or unreadable, then Table 1 may be changed such that Chinese and Japanese words are italicized when the font style of a word in the selected language version (e.g. the English version) is italicized. Similarly, if Chinese and Japanese words are readable when they are bolded, Table 1 may indicate that such words may be bolded if the word in the English version is bolded. In other words, Table 1 can be modified in virtually any manner such that the font style of certain language versions is automatically changed to a first font style when the font style of the selected language version is changed to a second font style. Furthermore, even if a first font style (e.g. an italics font style) is compatible with a certain language (e.g. the Chinese language), Table 1 may be designed to change the font style of a Chinese word to a second font style (e.g. an underlined font style) when the font style of a corresponding word in the selected language version is changed to the italics font style. Many reasons exist for designing the look up table of Table 1 in such a manner. For example, emphasizing a Chinese word by underlining it may be more aesthetically pleasing than emphasizing the Chinese word by italicizing it.

In an alternative, hypothetical embodiment, if the font style of a word in one language version (e.g. an English version) is changed (e.g. if an English word is italicized), the software editor automatically determines if such font style change is compatible with another language version (e.g. the Japanese version). If the change is compatible, the software editor italicizes the corresponding Japanese word. On the other hand, if the Japanese language does not support an italics font style, the font style of the corresponding Japanese word is not changed at all.

Figure 10:
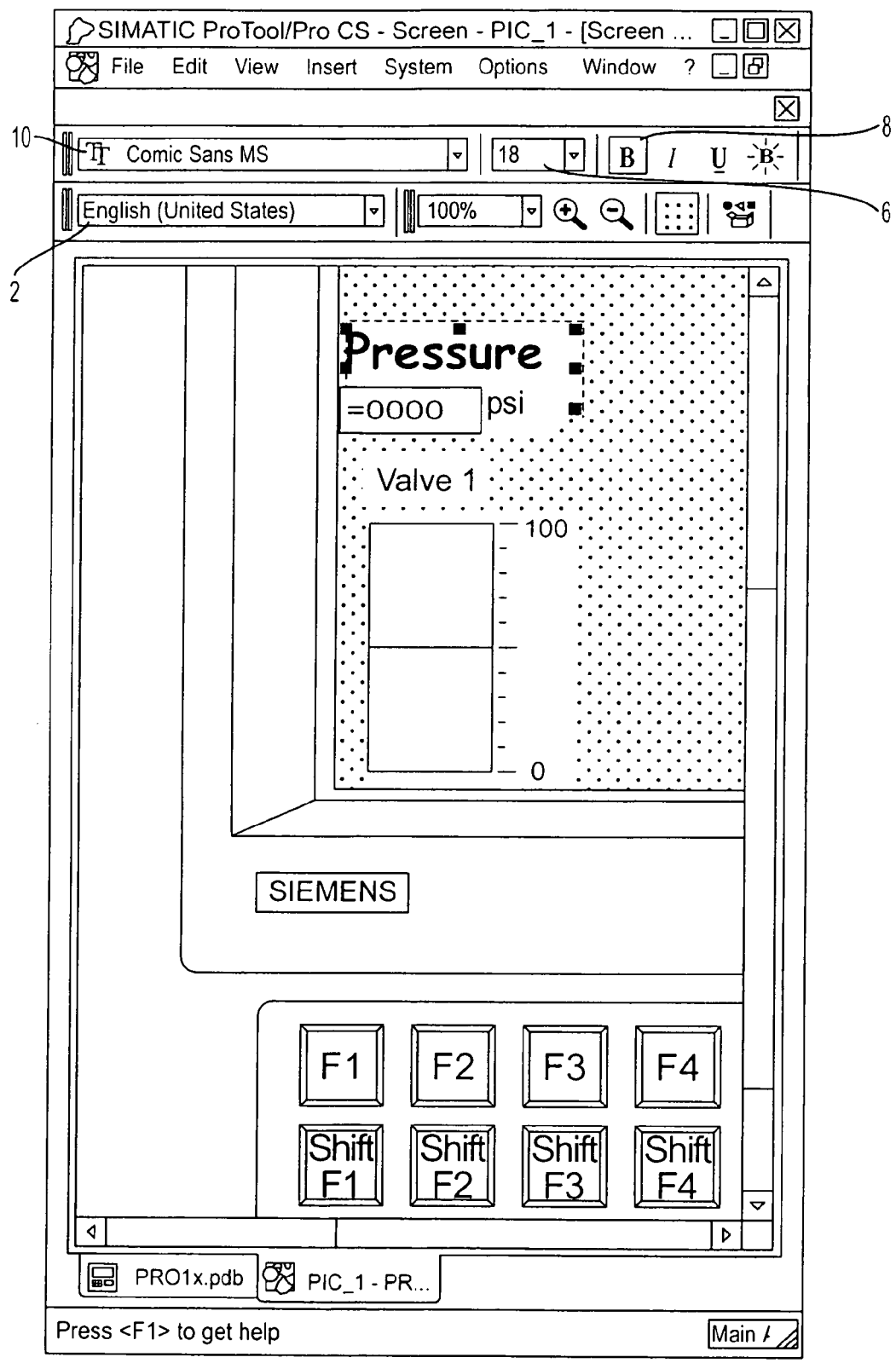
FIG. 10 is an illustrative example of the screen display of the software editor displaying the English version of the technical information in which the font size, font style, and font type of a particular word of the technical information have been changed.
Figure 13:
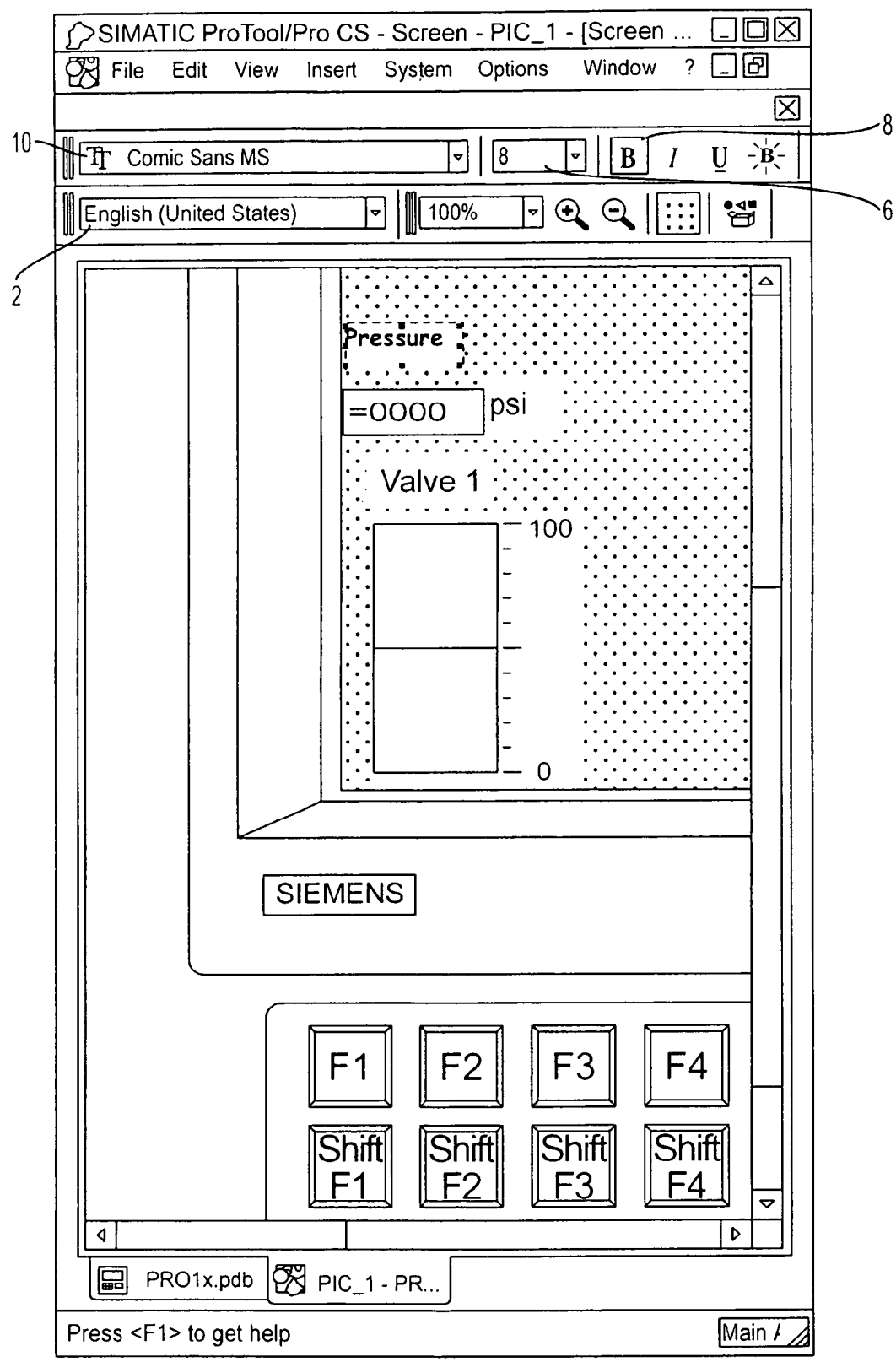
FIG. 13 is an illustrative example of the screen display of the software editor displaying the English version of the technical information in which the font size of a particular word of the technical information has been reduced.
Figure 14:
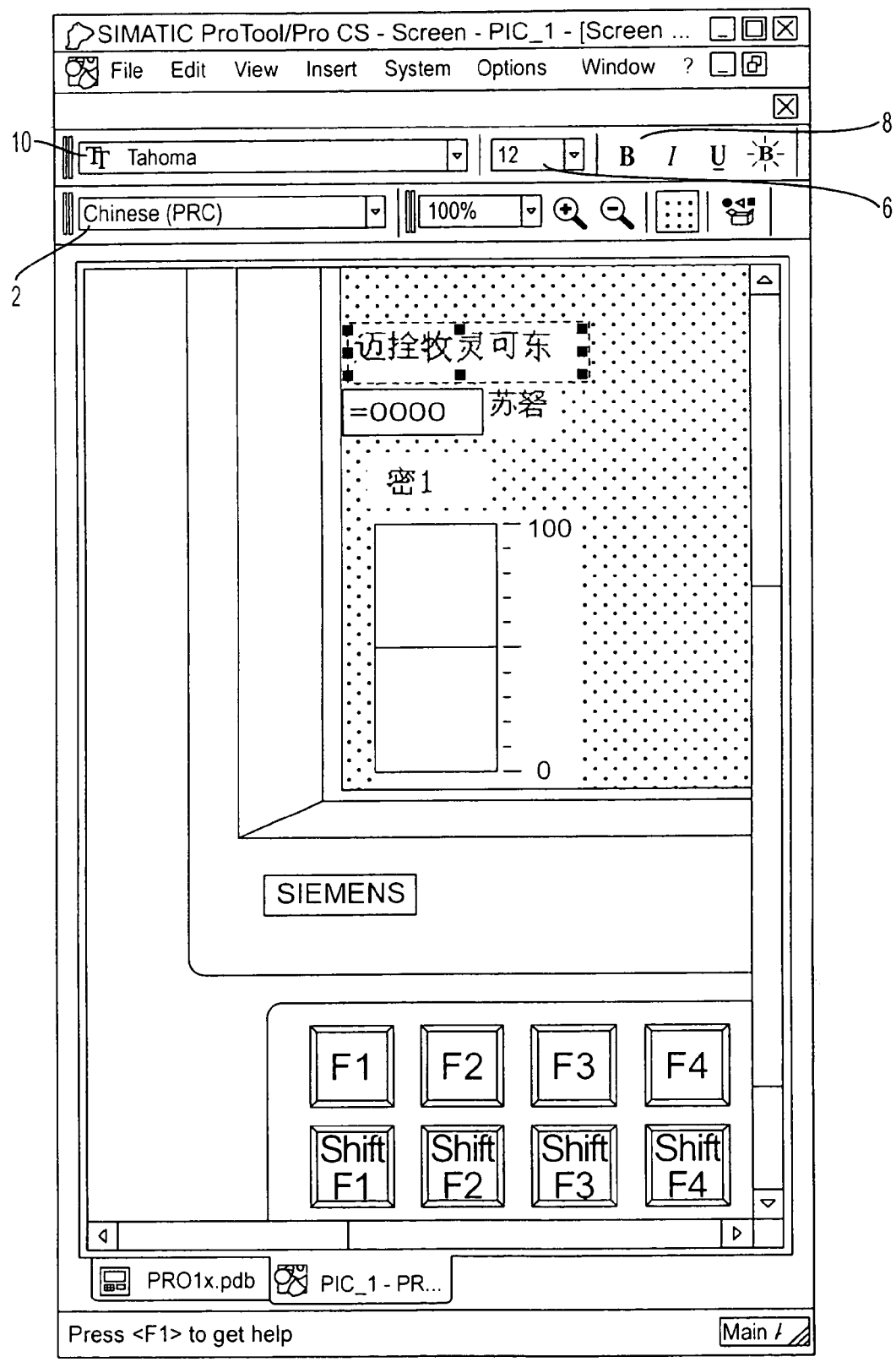
FIG. 14 is an illustrative example of the screen display of the software editor displaying a Chinese version of the technical information in which the font size of a particular word of the technical information has been reduced.

Also, since the Japanese and Chinese words are represented by kanji characters, reducing the font size of a Japanese or Chinese word below a minimum font size (e.g. a 12 point font size) may cause adjacent lines within the kanji characters to overlap and/or become too close together to be clearly readable. Accordingly, if the font size of a word in one language version (e.g. an English version) is reduced from a first font size (e.g. an 18 point font size) to a second font size (e.g. an 8 point font size), a corresponding word in another language version (e.g. a Chinese language version) cannot be reduced to an 8 point font size without becoming illegible. In such a situation, when the font size of the English word is reduced from an 18 point font size to an 8 point font size (see FIGS. 10 and 13), the software editor determines if the corresponding Chinese word can be reduced to an 8 point font size. If the Chinese word cannot be reduced to such a small font size, the software editor reduces the font size of the Chinese word to the smallest font size supported by the Chinese language version (e.g. a 12 point font size). (See FIG. 14). In an alternative embodiment, if the software editor determines that the Chinese word cannot be reduced to the 8 point font size, the font size of the Chinese word is not changed at all.

Figure 11:
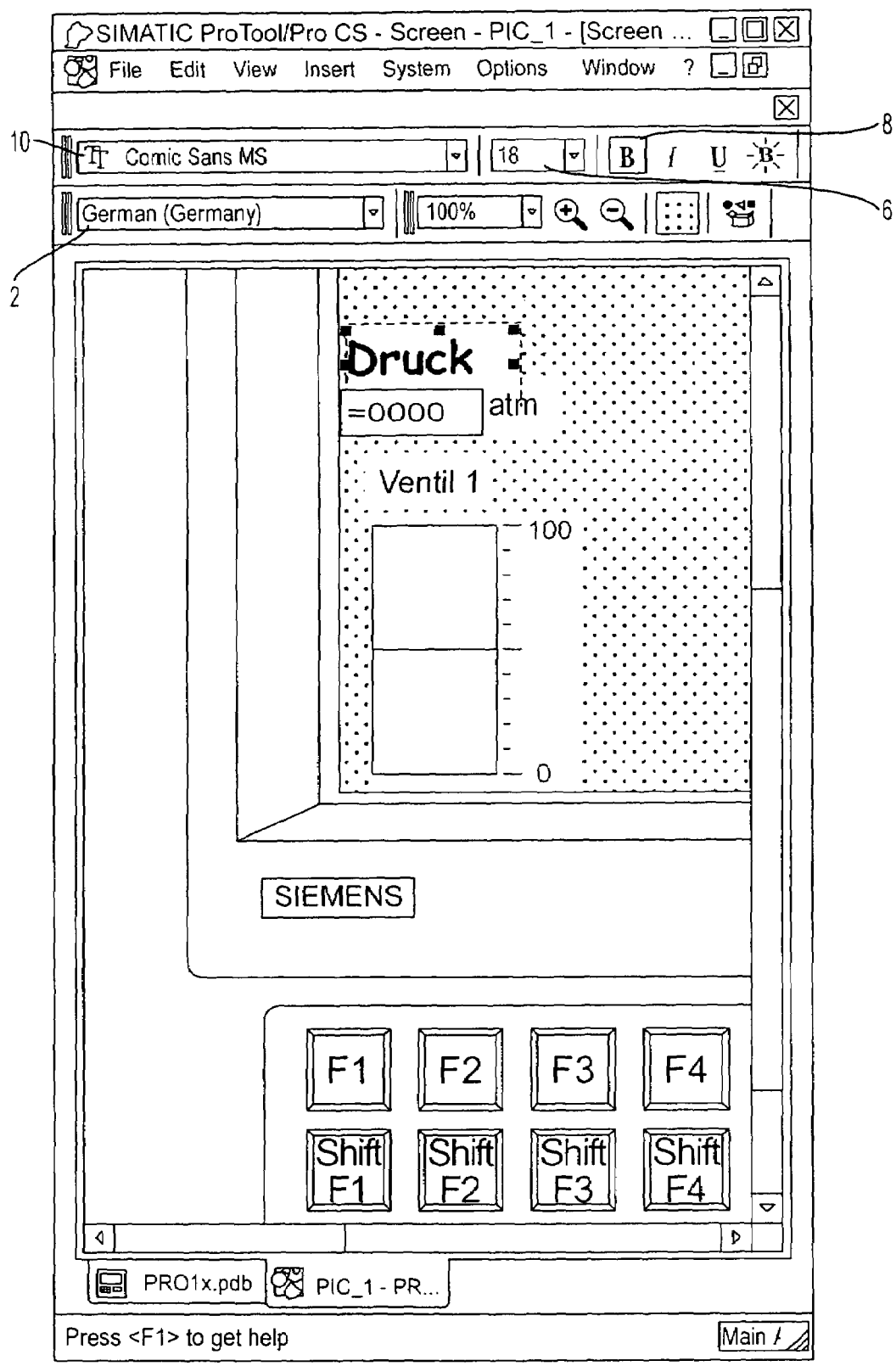
FIG. 11 is an illustrative example of the screen display of the software editor displaying the German version of the technical information in which the font size, font style, and font type of a particular word of the technical information have been changed.

The examples above describe how various embodiments change the font styles and font sizes of words for different language versions of the textual information. A similar situation exists when a user changes the font type of a word in one of the versions of the textual information. For instance, as shown in FIGS. 8 and 11, a user loads the German version of the textual information in the software editor and selects the German word "Druck". Then, the user selects the font type drop down box 10, and selects the "Comic Sans MS" option to change the font type of the word "Druck" from Tahoma to Comic Sans MS. Afterwards, the software editor determines that such modification is compatible with the English version of the textual information (i.e. the Comic Sans MS font supports English words) and changes the font type of the corresponding word "Pressure" in the English version from Tahoma to Comic Sans MS. (See FIGS. 7 and 10).

Figure 12:
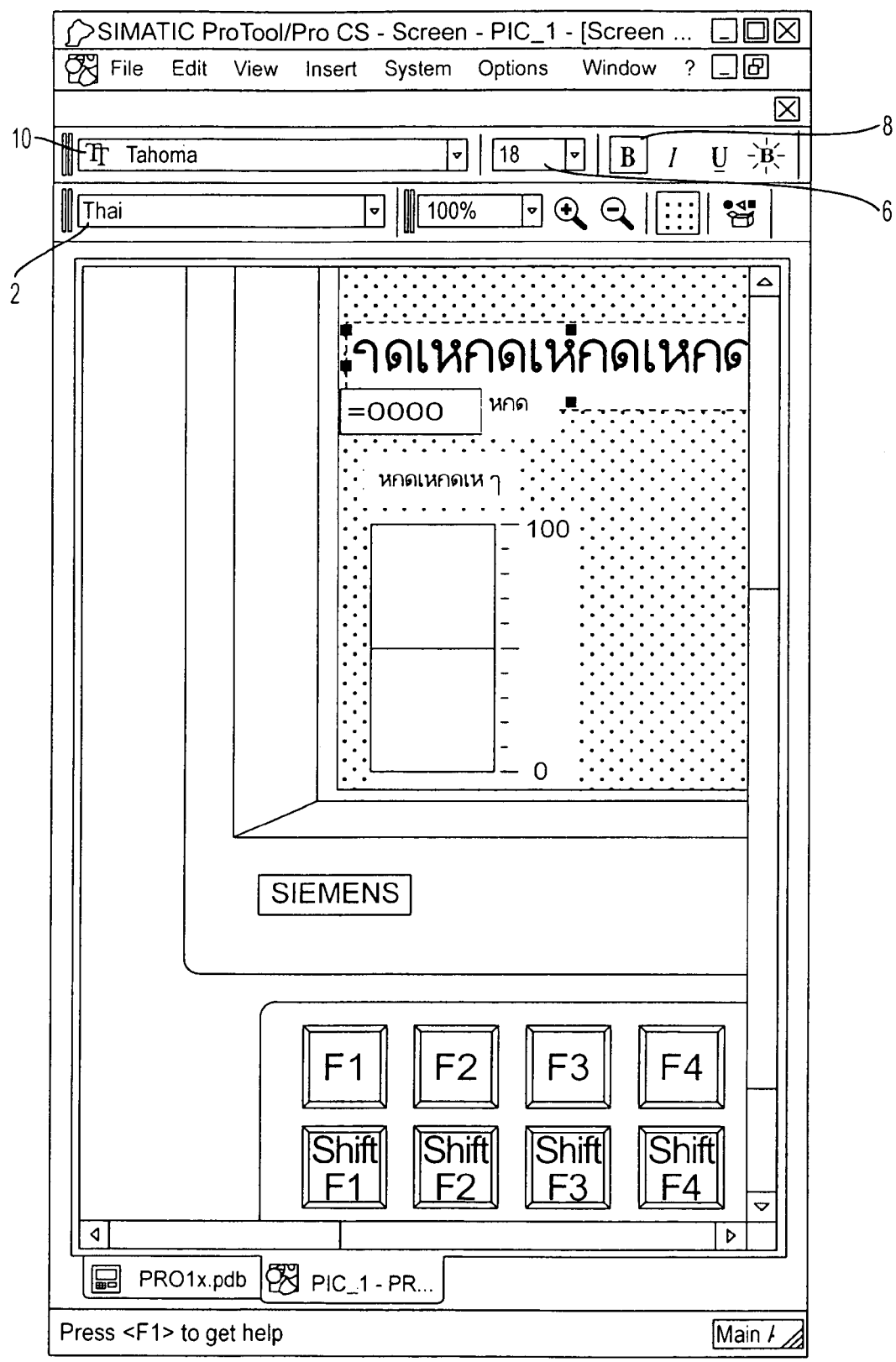
FIG. 12 is an illustrative example of the screen display of the software editor displaying the Thai version of the technical information in which the font size and font style of a particular word of the technical information have been changed but the font type of the particular word remains unchanged.

On the other hand, the software editor determines that the modification is not compatible with the Thai version of the textual information (i.e. the Comic Sans MS font does not support Thai words). In such case, the software editor determines the font type that most closely resembles the Comic Sans MS font and that supports Thai words. In the present example, the editor selects the Tahoma font type. (See FIG. 12). Since the Tahoma font is the font type of the corresponding Thai word before the font of the German word "Druck" was changed (see FIG. 9), the font type of the Thai word remains unchanged. However, if another font type that supports the Thai language resembled the Comic Sans MS font more closely than the Tahoma font, the software editor would have changed the font type of the Thai word from the Tahoma font to the other font.

One example of how the software editor determines if particular font types closely resemble each other will be described. For each font type, the software editor may store a data file containing language parameters and attribute parameters. The language parameters identify the various languages supported by the font type, and the attribute parameters identify various aesthetic attributes of the font type. For example, the attribute parameters may identify the thickness of the lines of the font, the sharpness of the lines of the font, the curviness of the lines of the font, whether the font has a fixed pitch or variable pitch, etc. Also, each of the attribute parameters may be further refined by weighting the parameters with a number (e.g. from 1–10) that corresponds to the degree that the corresponding attribute is contained in the font. For instance, if a particular font has very thick lines, the attribute parameter corresponding to the line thickness of the font may assigned a weighted value equal to "9".

When the font of a word of the German version of the textual information is changed from Tahoma to Comic Sans MS, the software editor must determine a font type for the corresponding Thai word in the Thai version of the information. Specifically, the editor evaluates the language parameters of each font and determines which font types support the Thai language (i.e. the Thai language fonts). Then, the software editor compares the weighted attribute parameters of the Thai language fonts with the weighted attribute parameters of the Comic Sans MS font to determine which of the Thai language fonts is the most similar to the Comic Sans MS font. In the above example, the software editor determines that the Tahoma font is the most similar to the Comic Sans MS font and writes the Thai word in the Tahoma font.

In an alternative embodiment, the software editor uses a previously stored look up table to determine how to change the font types of the English and Thai versions when the user changes the font type of the German version. The look up table is analogous to Table 1 described above. Accordingly, if the user changes the German version of the textual information from Tahoma to Comic Sans MS, the software editor uses the look up table to determine that the corresponding word in the Thai language version should be Tahoma. Thus, if the font type of the corresponding Thai word is not already Tahoma, the software editor changes the font type of the word to Tahoma.

In still another embodiment, a predetermined default font type that supports all of the language versions of the textual information is selected. Then, when the user changes the font type of a word in one language version (e.g. the German version) to a particular font type (e.g. the Comic Sans MS font type), the software editor determines if a second language version (e.g. the Thai version) is supported by Comic Sans MS. If the Thai version is supported by the font type, the editor changes the font type of the corresponding Thai word to Comic Sans MS. On the other hand, if the Thai version is not supported by the font type, the software editor changes the font type of the corresponding Thai word to the predetermined default font type (e.g. the Tahoma font type).

In yet another embodiment, if the font type of a word in one language version (e.g. a German version) is changed to a particular font type (e.g. the Comic Sans MS font type), the software editor automatically determines if the Comic Sans MS font type is compatible with another language version (e.g. the Thai language version). If the change is compatible, the software editor changes the font type of the corresponding Thai word to Comic Sans MS. On the other hand, if the Thai language version does not support the Comic Sans MS font type, the font type of the corresponding Thai word is simply not changed at all (i.e. the Thai word is still displayed in the Tahoma font type).

Also, besides determining the appropriate font of various words when the textual information is edited, the software editor determines the most appropriate font for words when an entirely new language version of the textual information is added for the first time. In such case, the software editor determines the font type of the new language according to any one of the techniques described above. Typically, if a particular font for one or more existing language versions supports the new language version, the software editor will write the new language version in the particular font.

In the examples described above, when a user edits one language version of the textual information, the software editor automatically edits the remaining language versions. The software editor functions in the above manner when it operates in an "Edit All Versions Mode". However, situations may arise in which the user desires to edit one version without editing the remaining versions. To satisfy such need, the software editor preferably provides a feature allowing the user to selectably change the operational mode of the software editor from the "Edit-All-Versions Mode" to an "Edit-Single-Version Mode". Additionally or alternatively, the user may selectively operate the software editor in an "Edit-Selected-Versions Mode". In such mode, the software editor allows the user to designate a subset of all of the versions of the textual information, and when the user edits one version of the information in a particular manner, the designated versions are automatically edited in the same manner.

There are many ways for the user to change the operational mode of the software editor. For example, the user may select an operational mode from a drop down box (not shown) in a way that is similar to the way that he or she selects a language from the language drop down box 2. By enabling the user to choose the operational mode of the software editor, the flexibility of the editor is greatly enhanced.

Figure 15:
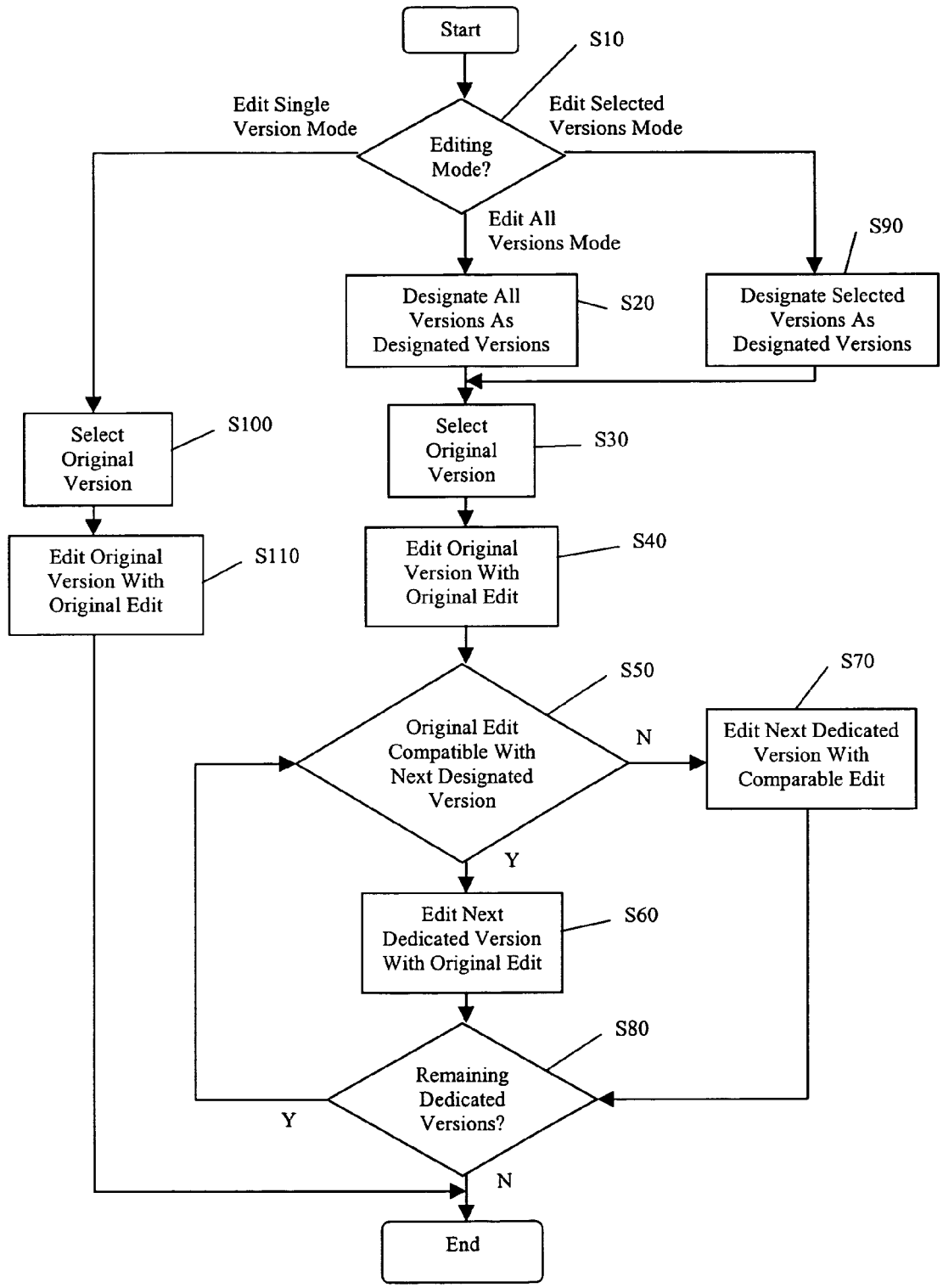
FIG. 15 illustrates an example of a routine performed by the software editor according to an embodiment of the present invention.

FIG. 15 generally illustrates an example of a routine performed by the software editor described above. Furthermore, as one skilled in the art clearly realizes, the order in which the process steps are executed is not limited by the order shown in FIG. 15. Also, many process steps can be added to or deleted from the steps shown in the figure without departing from the concepts of the present invention.

As shown in the figure, the editor determines which operating mode has been selected by the user (step S10). If the "Edit-All-Versions Mode" has been selected, the software editor designates all language versions as designated language versions (step S20). Then, the user selects an original language version (e.g. the German language version) of the textual information via the language drop down box 2, and the editor displays the German language version on the screen (step S30). Once the German language version is displayed, the user can edit the version (step S40). For example, as described above, the user may change the font size (e.g. 12 points, 18 points, etc.), font type (e.g. Tahoma, Comic Sans MS, etc), or font style (e.g. bold, italics, underline, etc.) of a particular German word or phrase.

After the German language version has been edited, the software editor analyzes the next designated language version (e.g. the Thai language version) and determines if the original edit performed on the German language version of the textual information is compatible with the Thai language version (step S50). If the original edit is compatible, the same original edit is performed on the Thai language version (step S60). On the other hand, if the original edit is not compatible, the software editor performs a comparable edit on the Thai language version of the textual information (step S70). For example, if the original edit changes the font of a word in the German language version to the Comic Sans MS font and the Comic Sans MS font does not support the Thai language version, the software editor may change the corresponding word in the Thai language version to a font that is similar to Comic Sans MS and that supports the Thai language version (i.e. the Tahoma font). Alternatively, as described above, if the original edit is not compatible with the Thai language version, the software editor does not edit the Thai language version at all.

After the Thai language version of the textual information has been edited in step S60 or S70, the software editor determines if any unedited dedicated language versions remain (step S80). If such versions remain, the process returns to step S50, and if no unedited dedicated versions remain, the process ends.

On the other hand, if the user has selected the "Edit-Selected-Versions Mode" (step S10), the software editor enables the user to designate certain language versions of the textual information as designated versions (step S90). Then, the process proceeds to step S30. However, if the user has selected the "Edit-Single-Version Mode" (step S1), the user selects an original language version (e.g. the German language version) of the textual information via the language drop down box 2, and the editor displays the German language version on the screen (step S100). Once the German language version is displayed, the user can edit the version (step S110), and after the version is edited, the process ends.

Figure 16:
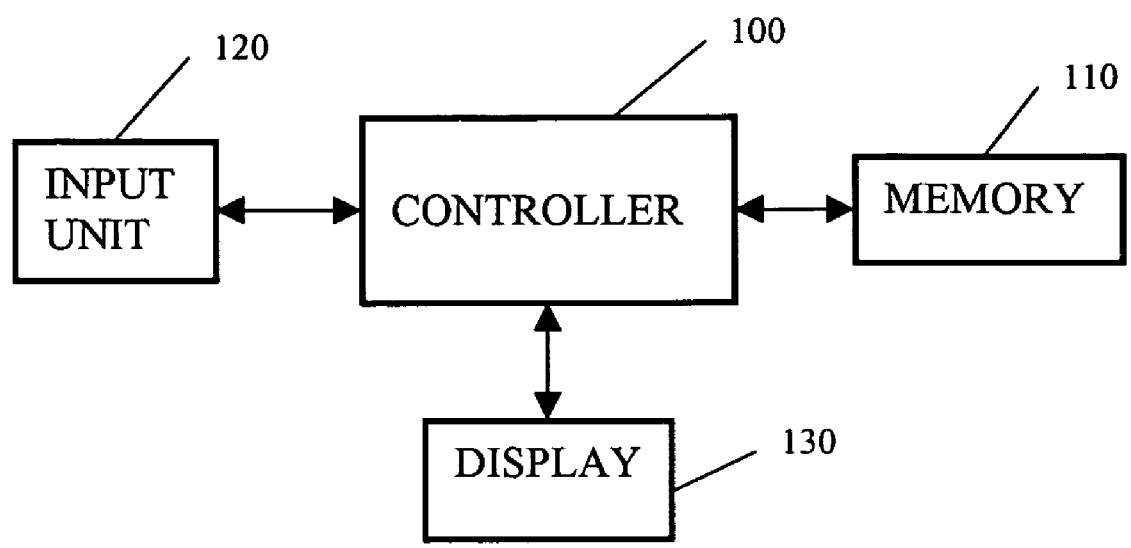
FIG. 16 is an illustrative example of a system that implements the software editor according to an embodiment of the present invention.

FIG. 16 is an illustrative example of a system that implements the software editor according to an embodiment of the present invention. As shown in the figure, the system comprises a controller 100, a memory 110, an input unit 120, and a display 130. The software editor is stored in the memory 110 (e.g. a RAM, ROM, hard disk, floppy disk, optical disk, etc.) and contains software routines that enable the controller 100 to perform the various functions and processes described above. The key input unit 120 (e.g. a mouse, keyboard, etc.) receives various commands and data from a user and outputs them to the controller 100 to selectively instruct the controller 100 to execute the software routines stored in the memory 110. When the controller 100 is executing the software routines, it outputs data to the display 130 (e.g. CRT monitor, LCD monitor, etc.) to be displayed, and the display 130 displays information similar to the information shown in FIGS. 1–14.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For instance, the above examples relate to the editing of textual information used in conjunction with factory machines and devices. However, the present invention is not limited to editing such type of information and can be applied to virtually any type of information. Therefore, the present invention is not intended to be limited to the embodiments described herein but is to be accorded the widest scope as defined by the limitations of the claims and equivalents thereof.

What is claimed is:

1. A method of editing multiple versions of information, comprising:
   (a) editing a first version of said information in accordance with a first modification; and
   (b) editing a second version of said information in accordance with a second modification,
   wherein editing said first version in accordance with said first modification causes said second version to be edited in accordance with said second modification,
   wherein said second version corresponds to said first version and said second modification corresponds to said first modification, and
   wherein, when said second version is edited in accordance with a third modification, said first version is automatically edited in accordance with a fourth modification, where said third modification corresponds to said fourth modification.

2. The method as claimed in claim 1, wherein said second modification of said second version is identical to said first modification of said first version when said first modification is compatible with said second version, and
   wherein said second modification of said second version is different but substantially equivalent to said first modification of said first version when said first modification is not compatible with said second version.

3. The method as claimed in claim 1, further comprising:
   (c) selecting an edit-multiple-versions mode as an editing mode, wherein said step (b) comprises:
      (b1) editing said second version of said information in accordance with said second modification when said first version is edited in accordance with said first modification and when said edit-multiple-versions mode is selected as said editing mode in said step (c).

4. The method as claimed in claim 3, wherein said edit-multiple-versions mode is an edit-all-versions mode, and
   wherein said step (b1) further comprises:
      (b1a) editing, in addition to editing said second version, all remaining versions of said information in accordance with remaining modifications, respectively, when said edit-all-versions mode is selected as said editing mode in said step (c),
   wherein editing said first version in accordance with said first modification causes said all remaining versions to be edited in accordance with said remaining modifications, respectively, and
   wherein said remaining versions correspond to said first version and said remaining modifications correspond to said first modification.

5. The method as claimed in claim 1, further comprising:
   (c) selecting an edit-all-versions mode or an edit-selected-versions mode as an editing mode,
   wherein said step (b) comprises:
      (b1) editing said second version in accordance with said second modification and editing all remaining versions of said information in accordance with remaining modifications, respectively, when said edit-all-versions mode is selected as said editing mode in said step (c),
   wherein editing said first version in accordance with said first modification causes said all remaining versions to be edited in accordance with said remaining modifications, respectively.

6. The method as claimed in claim 5, further comprising:
   (d) designating selected versions of said multiple versions of said information, wherein said selected versions are a subset of said multiple versions and
   wherein said step (b) further comprises:
      (b2) editing said second version in accordance with said second modification when said edit-selected-versions mode is selected as said editing mode in said step (c), when said second version is one of said selected versions designated in said step (d), and when said first version is edited in accordance with said first modification.

7. The method as claimed in claim 1, wherein said information is textual information,
   wherein said first version of said textual information is said textual information written in a first language, and
   wherein said second version of said textual information is said textual information written in a second language.

8. The method as claimed in claim 7, wherein said second modification of said second language is identical to said first modification of said first language when said first modification is compatible with said second language, and
   wherein said second modification of said second language is different but substantially equivalent to said first modification of said first language when said first modification is not compatible with said second language.

9. The method as claimed in claim 8, wherein said first modification is a change in font size of a word of said first language.

10. The method as claimed in claim 8, wherein said first modification is a change in font style of a word of said first language.

11. The method as claimed in claim 8, wherein said first modification is a change in font type of a word of said first language.

12. A method of editing multiple language versions of textual information, comprising:
   (a) editing a first language version of said textual information in accordance with a first modification; and
   (b) editing a second language version of said textual information in accordance with a second modification,
   wherein editing said first version in accordance with said first modification causes said second version to be edited in accordance with said second modification,
   wherein said second modification of said second language version is identical to said first modification of said first language version when said first modification is compatible with said second language version,
   wherein said second modification of said second language version is different but substantially equivalent to said first modification of said first language version when said first modification is not compatible with said second language version, and
   wherein, when said second language version is edited in accordance with a third modification, said first language version is automatically edited in accordance with a fourth modification, where said third modification corresponds to said fourth modification.

13. The method as claimed in claim 12, further comprising:
   (c) selecting an edit-multiple-versions mode as an editing mode, wherein said step (b) comprises:
      (b1) editing said second language version of said textual information in accordance with said second modification when said first language version is edited in accordance with said first modification and when said edit-multiple-versions mode is selected as said editing mode in said step (c).

14. The method as claimed in claim 13, wherein said first modification is at least one of a change in font size of a word of said first language version, a change in font style of a word of said first language version, and a change in font type of a word of said first language version.

15. A software editor contained on a computer-readable medium, wherein the software editor is adapted to edit multiple versions of information and comprises software instructions for:
   (a) editing a first version of said information in accordance with a first modification; and
   (b) automatically editing a second version of said information in accordance with a second modification when said first version is edited in accordance with said first modification,
   wherein said second version corresponds to said first version and said second modification corresponds to said first modification, and
   wherein when said second version is edited in accordance with a third modification, said first version is automatically edited in accordance with a fourth modification, where said third modification corresponds to said fourth modification.

16. The software editor as claimed in claim 15, wherein said second modification of said second version is identical to said first modification of said first version when said first modification is supported by said second version, and
   wherein said second modification of said second version is different but substantially equivalent to said first modification of said first version when said first modification is not supported by said second version.

17. The software editor as claimed in claim 15, further comprising software instructions for:
   (c) selecting an edit-multiple-versions mode as an editing mode, wherein said step (b) comprises:
      (b1) automatically editing said second version of said information in accordance with said second modification when said first version is edited in accordance with said first modification and when said edit-multiple-versions mode is selected as said editing mode in said step (c).

18. The software editor as claimed in claim 17, wherein said edit-multiple-versions mode is an edit-all-versions mode, and wherein said step (b1) further comprises:
   (b1a) automatically editing, in addition to editing said second version, all remaining versions of said information in accordance with remaining modifications, respectively, when said first version is edited in accordance with said first modification and when said edit-all-versions mode is selected as said editing mode in said step (c),
   wherein said remaining versions correspond to said first version and said remaining modifications correspond to said first modification.

19. The software editor as claimed in claim 15, further comprising software instructions for:
   (c) selecting an edit-all-versions mode or an edit-selected-versions mode as an editing mode,
   wherein said step (b) comprises:
      (b1) automatically editing said second version in accordance with said second modification and editing all remaining versions of said information in accordance with remaining modifications, respectively, when said first version is edited in accordance with said first modification and when said edit-all-versions mode is selected as said editing mode in said step (c).

20. The software editor as claimed in claim 19, further comprising instructions for:
   (d) designating selected versions of said multiple versions of said information, wherein said selected versions are a subset of said multiple versions and
   wherein said step (b) further comprises:
      (b2) automatically editing said second version in accordance with said second modification when said edit-selected-versions mode is selected as said editing mode in said step (c), when said second version is one of said selected versions designated in said step (d), and when said first version is edited in accordance with said first modification.

21. The software editor as claimed in claim 15, wherein said information is textual information,
   wherein said first version of said textual information is said textual information written in a first language, and
   wherein said second version of said textual information is said textual information written in a second language.

22. The software editor as claimed in claim 21, wherein said second modification of said second language is identical to said first modification of said first language when said first modification is supported by said second language, and
wherein said second modification of said second language is different but substantially equivalent to said first modification of said first language when said first modification is not supported by said second language.

23. The software editor as claimed in claim 22, wherein said first modification is at least one of a change in font size of a word of said first language, a change in font style of a word of said first language, and a change in font type of a word of said first language.

24. A software editor contained on a computer-readable medium, wherein the software editor is adapted to edit multiple language versions of textual information and comprises software instructions for:
(a) editing a first language version of said textual information in accordance with a first modification; and
(b) automatically editing a second language version of said textual information in accordance with a second modification when said first language version is edited in accordance with said first modification,
wherein said second modification of said second language version is identical to said first modification of said first language version when said first modification is supported by said second language version,
wherein said second modification of said second language version is different but substantially equivalent to said first modification of said first language version when said first modification is not supported by said second language version, and
wherein when said second language version is edited in accordance with a third modification, said first language version is automatically edited in accordance with a fourth modification, where said third modification corresponds to said fourth modification.

25. The software editor as claimed in claim 24, further comprising instructions for:
(c) selecting an edit-multiple-versions mode as an editing mode, wherein said step (b) comprises:
(b1) automatically editing said second language version of said textual information in accordance with said second modification when said first language version is edited in accordance with said first modification and when said edit-multiple-versions mode is selected as said editing mode in said step (c).

26. The software editor as claimed in claim 25, wherein said first modification is at least one of a change in font size of a word of said first language version, a change in font style of a word of said first language version, and a change in font type of a word of said first language version.

27. An editing device for editing multiple versions of information, comprising:
an input unit for inputting commands from a user;
a storage device for storing said information; and
a controller coupled to said storage device and said input unit,
wherein said controller edits a first version of said information in accordance with a first modification input from said user via said input device and automatically edits a second version of said information in accordance with a second modification when said first version is edited in accordance with said first modification,
wherein said second version corresponds to said first version and said second modification corresponds to said first modification, and wherein when said second version is edited in accordance with a third modification, said first version is automatically edited in accordance with a fourth modification, where said third modification corresponds to said fourth modification.

28. The editing device as claimed in claim 27, wherein said second modification of said second version is identical to said first modification of said first version when said first modification is compatible with said second version, and
wherein said second modification of said second version is a predetermined equivalent to said first modification of said first version when said first modification is not compatible with said second version.

29. The editing device as claimed in claim 27, wherein said input unit inputs a mode selection command from said user and said controller operates in an edit-multiple-versions mode or an edit-single-version mode based on said mode selection command,
wherein said controller automatically edits said second version of said information in accordance with said second modification when said first version is edited in accordance with said first modification and when said controller is operating in said edit-multiple-versions mode, and
wherein said controller does not edit said second version of said information when said controller is operating in said edit-single-version mode.

30. The editing device as claimed in claim 29, wherein said edit-multiple-versions mode is an edit-all-versions mode,
wherein said controller automatically edits, in addition to editing said second version, all remaining versions of said information in accordance with remaining modifications, respectively, when said first version is edited in accordance with said first modification and when said controller is operating in said edit-all-versions mode, and
wherein said remaining versions correspond to said first version and said remaining modifications correspond to said first modification.

31. The editing device as claimed in claim 27, wherein said input unit inputs a mode selection command from said user and said controller operates in an edit-all-versions mode, an edit-selected-versions mode, or an edit-single-version mode based on said mode selection command,
wherein said controller automatically edits said second version in accordance with said second modification and edits all remaining versions of said information in accordance with remaining modifications, respectively, when said first version is edited in accordance with said first modification and when said controller is operating in said edit-all-versions mode, and
wherein said controller does not edit said second version of said information when said controller is operating in said edit-single-version mode.

32. The editing device as claimed in claim 31, wherein said input unit inputs designation information from said user,
wherein said controller designates selected versions of said multiple versions of said information based on said designation information,
wherein said selected versions are a subset of said multiple versions, and
wherein said controller automatically edits said second version in accordance with said second modification when said controller is operating in said edit-selected-versions mode, when said second version is one of said selected versions, and when said first version is edited in accordance with said first modification.

33. The editing device as claimed in claim 27, wherein said information is textual information,
wherein said first version of said textual information is said textual information written in a first language, and
wherein said second version of said textual information is said textual information written in a second language.

34. The editing device as claimed in claim 33, wherein said second modification of said second language is identical to said first modification of said first language when said first modification is compatible with said second language, and
wherein said second modification of said second language is a predetermined equivalent to said first modification of said first language when said first modification is not compatible with said second language.

35. The editing device as claimed in claim 34, wherein said first modification is at least one of a change in font size of a word of said first language, a change in font style of a word of said first language, and a change in font type of a word of said first language.

36. An editing device for editing multiple language versions of textual information, comprising:
an input unit for inputting commands from a user;
a storage device for storing said textual information; and
a controller coupled to said storage device and said input unit,
wherein said controller edits a first language version of said textual information in accordance with a first modification input from said user via said input unit and automatically edits a second language version of said textual information in accordance with a second modification when said first language version is edited in accordance with said first modification,
wherein said second modification of said second language version is identical to said first modification of said first language version when said first modification is compatible with said second language version,
wherein said second modification of said second language version is a predetermined equivalent to said first modification of said first language version when said first modification is not compatible with said second language version, and
wherein, when said second language version is edited in accordance with a third modification, said first language version is automatically edited in accordance with a fourth modification, where said third modification corresponds to said fourth modification.

37. The editing device as claimed in claim 36, wherein said input unit inputs a mode selection command from said user and said controller operates in an edit-multiple-versions mode or an edit-single-version mode based on said mode selection command,
wherein said controller automatically edits said second language version of said textual information in accordance with said second modification when said first language version is edited in accordance with said first modification and when said controller is operating in said edit-multiple-versions mode, and
wherein said controller does not edit said second language version of said textual information when said controller is operating in said edit-single-version mode.

38. The editing device as claimed in claim 37, wherein said first modification is at least one of a change in font size of a word of said first language version, a change in font style of a word of said first language version, and a change in font type of a word of said first language version.

39. A method of editing multiple versions of information, comprising:
(a) receiving a first input defining a first modification;
(b) modifying a first version of said information in accordance with said first modification when said first input is received in said step (a); and
(c) modifying a second version of said information in accordance with a second modification in response to said first version being modified in accordance with said first modification in said step (b),
wherein said second version corresponds to said first version and said second modification corresponds to said first modification, and
wherein, when said second version is edited in accordance with a third modification, said first version is automatically edited in accordance with a fourth modification, where said third modification corresponds to said fourth modification.

40. The method as claimed in claim 39, wherein said second modification of said second version is identical to said first modification of said first version when said first modification is supported by said second version, and
wherein said second modification of said second version is similar to said first modification of said first version when said first modification is not supported by said second version.

41. The method as claimed in claim 39, wherein said information is textual information,
wherein said first version of said textual information is said textual information written in a first language, and
wherein said second version of said textual information is said textual information written in a second language.

42. The method as claimed in claim 41, wherein said second modification of said second language is identical to said first modification of said first language when said first modification is compatible with said second language, and
wherein said second modification of said second language is different but substantially equivalent to said first modification of said first language when said first modification is not compatible with said second language.

43. The method as claimed in claim 42, wherein said first modification is at least one of a change in font size of a word of said first language, a change in font style of a word of said first language, and a change in font type of a word of said first language.

44. A method of editing multiple language versions of textual information, comprising:
(a) editing a first language version of said textual information in accordance with a first modification;
(b) determining if said first modification is compatible with a second language version of said textual information;
(c) editing said second language version of said textual information in accordance with said first modification if said first modification is compatible with said second language version; and
(d) not editing said second language version of said textual information if said first modification is not compatible with said second language version,
wherein editing said first language version in accordance with said first modification causes said second language version to be edited in accordance with said first modification.

45. A software editor contained on a computer-readable medium, wherein the software editor is adapted to edit multiple language versions of textual information and comprises software instructions for:
- (a) editing a first language version of said textual information in accordance with a first modification;
- (b) determining if said first modification is compatible with a second language version of said textual information;
- (c) automatically editing said second language version of said textual information in accordance with said first modification when said first language version is edited in accordance with said first modification and when said first modification is compatible with said second language version; and
- (d) not editing said second language version of said textual information if said first modification is not compatible with said second language version.

46. An editing device for editing multiple language versions of textual information, comprising:

an input unit for inputting commands from a user;

a storage device for storing said textual information; and a controller coupled to said storage device and said input unit, wherein said controller edits a first language version of said textual information in accordance with a first modification input from said user via said input device, wherein said controller determines if said first modification is supported by a second language version of said textual information, wherein said controller automatically edits said second language version of said textual information in accordance with said first modification when said first language version is edited in accordance with said first modification and when said first modification is supported by said second language version, and wherein said controller does not edit said second language version of said textual information if said first modification is not supported by said second language version.

* * * * *